United States Patent [19]

Shiu et al.

[11] 4,257,448

[45] Mar. 24, 1981

[54] FLOW CUT-OFF DEVICE FOR INSERTION IN A GAS DUCT

[76] Inventors: Chan K. Shiu; Leung W. Kwong, both of 8A, Hankow Rd., 5th Floor, Kowloon, Hong Kong

[21] Appl. No.: 969,837

[22] Filed: Dec. 15, 1978

[51] Int. Cl.³ .............................................. F16K 17/00
[52] U.S. Cl. .................................... 137/460; 137/498; 137/519.5
[58] Field of Search ..................... 137/460, 498, 519.5; 251/207

[56] References Cited

U.S. PATENT DOCUMENTS

| 2,951,501 | 9/1960 | Thylefors | 251/207 X |
| 3,407,827 | 10/1968 | Follett | 137/519.5 X |
| 3,969,605 | 7/1976 | Danell | 137/519.5 X |

FOREIGN PATENT DOCUMENTS 1534672 12/1978 United Kingdom ................. 137/519.5

Primary Examiner—Harold W. Weakley
Attorney, Agent, or Firm—Prutzman, Kalb, Chilton & Alix

[57] ABSTRACT

The device has a gas passage of adjustable flow cross-section through which gas flows in normal use. Inflowing gas also acts on a blocking member, and when the pressure of the inflow gas rises above a certain value, the pressure on the blocking member is sufficient to move the blocking member into the gas passage to block the passage. The blocking member is then retained in position in the passage, blocking the gas flow by the gas pressure. The blocking member can be a ball which is moved against the force of gravity by the pressure of the gas to close the passage.

5 Claims, 2 Drawing Figures

U.S. Patent  Mar. 24, 1981  4,257,448
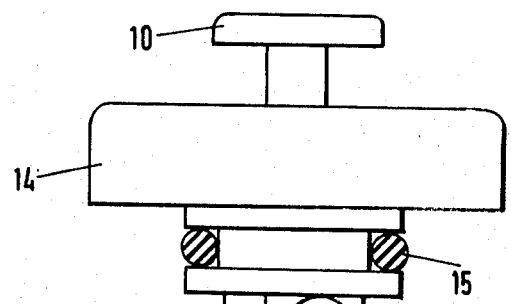
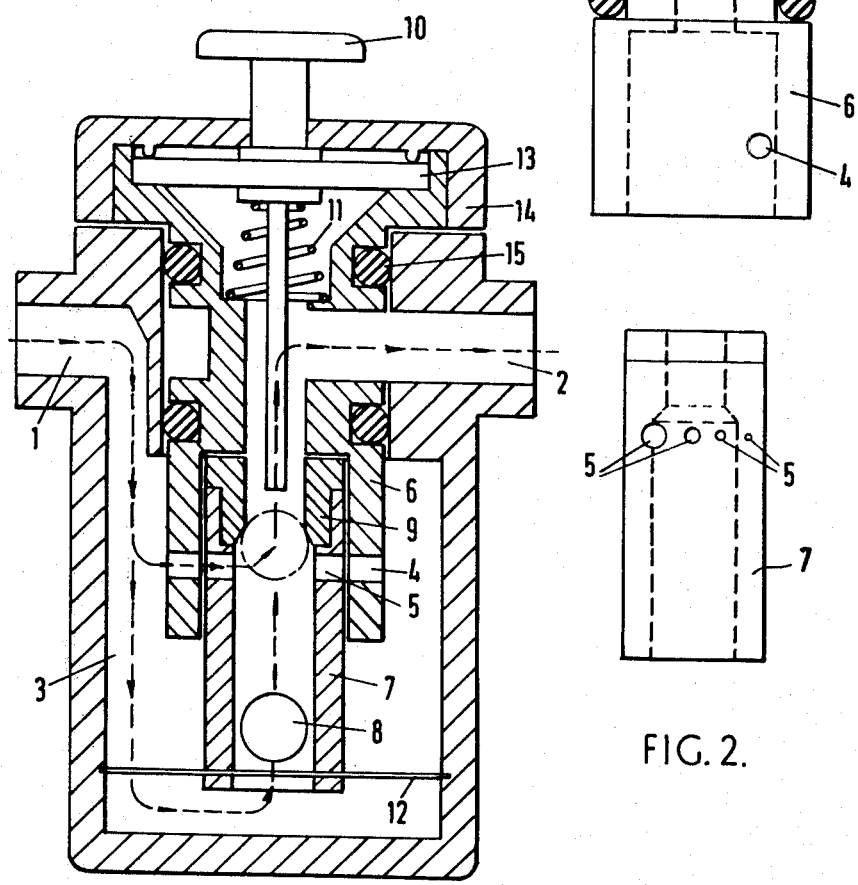
FIG.1.
FIG.2.

FLOW CUT-OFF DEVICE FOR INSERTION IN A GAS DUCT

This invention relates to a cut-off device for insertion in a gas duct to reduce the possibility of gas leaking into a room as a result of damage to, for instance, the gas duct.

Devices of this type are known, and are disclosed in six British Patent Specifications which are known to the applicants. These Specifications are numbers 1,371,201, 1,295,917, 1,164,537, 968,523, 823,747, 610,060.

According to the invention, there is provided a flow cut-off device for insertion in a gas-duct, the device comprising an inlet and an outlet, a chamber on the inlet side of the device, a passage leading from the chamber to the outlet and including two mutually rotatable coaxial tubes each having a plurality of holes through their walls arranged so that the flow cross-section through the passage can be altered by relative rotation of the tubes, and a blocking member arranged to be acted upon by the pressure in the chamber when this exceeds a predetermined value to move into a position where it blocks the passage, and prevents gas flowing through the outlet.

The device is intended to be inserted immediately adjacent a gas supply, with a gas duct leading from the outlet of the device to the appliance where the gas is to be used. In such set-ups, the duct is particularly vulnerable. This is often of a flexible nature and can perish or break; furthermore, the appliance could be damaged or the duct could become disconnected. If any of these events did occur, a large quantity of gas would attempt to flow from the supply, and since the passage is of a limited cross-section relative to the volume of the chamber, the pressure in the chamber will rise, thus activating the device to cut-off the gas supply.

Preferably, in use, the device is arranged so that the blocking member moves vertically to enter the passage and, in normal operation, is kept in a non-blocking position by gravity.

The blocking member may be a ball which cooperates with a corresponding seat in the passage. The ball could be guided for movement into the passage by a tube with a transverse pin across its lower end to retain the ball in the tube.

Conveniently, the device can include a resetting member in the form of a plunger, operable from outside the device, for pushing the blocking member out of the passage when normal pressure conditions once more prevail. The plunger can be spring loaded.

The invention will now be further described, by way of example, with reference to the accompanying drawings, in which:

FIG. 1 shows a cross-section through a device according to the invention; and

FIG. 2 is an exploded view of the device of FIG. 1.

The inlet to the device is marked 1, and the outlet 2. Dotted lines show the direction of gas flow through the device. Inflowing gas enters first of all the chamber 3. From there it flows through the apertures 4 and 5 respectively in sleeve 6 and tube 7. These apertures form the beginning of the passage leading from the chamber to the outlet, and this passage continues up the centre of the device and to the outlet 2, following the dotted lines.

If an exceptionally large demand for gas occurs at the outlet side of the device, a larger throughput will be needed and because of the relatively small dimensions of the apertures 4, 5 a pressure larger than normal will build up in chamber 3. This pressure acts all around the chamber, and in particular on the underside of ball 8 at the bottom of tube 7. When the pressure acts on this ball 8, it will be pushed upwards because it is free to move, until it abuts the seat 9 where it blocks the gas flow passage. The gas supply from the inlet will therefore be blocked. The seat 9 is preferably a rubber bushing.

Once the defect in the gas duct or appliance has been remedied, the flow cut-off device can be opened again by depressing the plunger 10 against the force of spring 11. The lower end of the plunger 10 will push the ball away fron the seat 9, and once gas has once again started to flow through apertures 4, 5 to the outlet, the ball 9 will fall under gravity to the bottom of the tube 7 where it is retained by a pin 12 passing through the bottom of the tube. The purpose of the pin 12 is just to stop the ball falling out of the tube while allowing it to be influenced by the pressure in chamber 3.

A rubber plate 13 seals the top of the device.

The flow cross-section can be altered by rotating a regulator 14 either clockwise or anticlockwise. This causes sleeve 6 to rotate relative to tube 7. A plurality of holes 5 of different sizes are drilled in tube 7, in such a configuration that different size holes align with the holes 4 in sleeve 6 in different positions of the regulator 14 to alter the area of the passage from chamber 3 to the outlet 2.

Sealing rings 15 prevent a leakage of gas from the device itself.

We claim:

1. A flow cut-off device for insertion in a gas duct, the device comprising an inlet and an outlet, a chamber on the inlet side of the device, a passage leading from the chamber to the outlet and including two mutually rotatable coaxial tubes having a plurality of holes through their walls arranged so that the flow cross-section through the passage can be altered by relative rotation of the tubes, and a seat on the outlet side of said holes; a blocking member subject on one side to the pressure in the chamber and on an opposite side to the pressure at the outlet; and means for guiding the blocking member between a lower non-blocking position and an upper position in which it engages the seat to block the passage and prevent gas flowing through the outlet, said blocking member being arranged to move to said upper position when the pressure differential across the blocking member exceeds a predetermined value.

2. A device as claimed in claim 1, wherein the blocking device is kept in its non-blocking position by gravity unless the pressure differential across the blocking member exceeds said predetermined value.

3. A device as claimed in claim 1, wherein the blocking member is a ball and the guide means is a vertically oriented tube having a transverse pin across its lower end to retain the ball in the tube.

4. A device as claimed in claim 1, further comprising a resetting member in the form of a plunger operable from outside the device for pushing the blocking member away from the seat when normal pressure conditions once more prevail.

5. A device as claimed in claim 4, wherein the plunger is spring-loaded.

* * * * *